United States Patent
Cheng et al.

(10) Patent No.: US 8,610,758 B2
(45) Date of Patent: Dec. 17, 2013

(54) DEPTH MAP GENERATION FOR A VIDEO CONVERSION SYSTEM

(75) Inventors: Chao-Chung Cheng, Taipei (TW); Chung-Te Li, Taipei (TW); Liang-Gee Chen, Taipei (TW); Ling-Hsiu Huang, Sinshih Township, Tainan County (TW)

(73) Assignees: Himax Technologies Limited, Tainan (TW); National Taiwan University, Taipei (TW)

( * ) Notice: Subject to any disclaimer, the term of this patent is extended or adjusted under 35 U.S.C. 154(b) by 546 days.

(21) Appl. No.: 12/875,158

(22) Filed: Sep. 3, 2010

(65) Prior Publication Data

US 2011/0141237 A1 Jun. 16, 2011

Related U.S. Application Data

(60) Provisional application No. 61/286,397, filed on Dec. 15, 2009.

(51) Int. Cl.
*H04N 13/02* (2006.01)

(52) U.S. Cl.
USPC .................................. 348/46; 348/E13.017

(58) Field of Classification Search
USPC ........................................... 348/46, E13.017
See application file for complete search history.

(56) References Cited

U.S. PATENT DOCUMENTS

| | | | | |
|---|---|---|---|---|
| 8,213,711 B2* | 7/2012 | Tam et al. | | 382/162 |
| 2004/0057613 A1* | 3/2004 | Noto et al. | | 382/154 |
| 2008/0002910 A1* | 1/2008 | Ojima et al. | | 382/277 |
| 2008/0247670 A1 | 10/2008 | Tam et al. | | |
| 2009/0002368 A1* | 1/2009 | Vitikainen et al. | | 345/422 |
| 2009/0196492 A1 | 8/2009 | Jung et al. | | |
| 2010/0073364 A1* | 3/2010 | Jung et al. | | 345/419 |
| 2010/0080448 A1* | 4/2010 | Tam et al. | | 382/154 |
| 2011/0096832 A1* | 4/2011 | Zhang et al. | | 375/240.08 |

FOREIGN PATENT DOCUMENTS

| | | |
|---|---|---|
| JP | 2007522589 A | 8/2007 |
| KR | 20090084563 A | 8/2009 |
| TW | 200913673 A | 3/2009 |
| TW | 200909064 A | 7/2009 |

OTHER PUBLICATIONS

Chao-Chung Cheng, Chung-Te Li, Yi-Min Tsai and Liang-Gee Chen, "A Quality-Scalable Depth-Aware Video Processing System," SID 2009 International Symposium, Seminar, and Exhibition (SID), San Antonio TX, USA, May 2009.

(Continued)

*Primary Examiner* — Anner Holder
(74) *Attorney, Agent, or Firm* — Su IP Consulting

(57) ABSTRACT

In accordance with at least some embodiments of the present disclosure, a process for generating a depth map for converting a two-dimensional (2D) image to a three-dimensional (3D) image is described. The process may include generating a depth gradient map from the 2D image, wherein the depth gradient map is configured to associate one or more edge counts with one or more depth values, extracting an image component from the 2D image, wherein the image component is associated with a color component in a color space, determining a set of gains to adjust the depth gradient map based on the image component, and generating the depth map by performing depth fusion based on the depth gradient map and the set of gains.

23 Claims, 5 Drawing Sheets

(56) References Cited

OTHER PUBLICATIONS

Chao-Chung Cheng, Chung-Te Li and Liang-Gee Chen, "51.3: An Ultra-Low-Cost 2-D/3-D Video-Conversion System," SID 10 Digest, 2010, p. 766-769, ISSN 0097-966X/10/4102-0766.

Wan-Yu Chen, Yu-Lin Chang, Hsu-Kuang Chiu, Shao-Yi Chien and Liang-Gee Chen, "Real-Time Depth Image Based Rendering Hardware Accelerator for Advanced Three Dimensional Television System," ICME 2006, p. 2069-2072, 1424403677/06/ © 2006 IEEE.

Yong Ju Jung, Aron Baik, Jiwon Kim and Dusik Park, "A novel 2D-to-3D conversion technique based on relative height depth cue," SPIE-IS&T/ vol. 7237, Feb. 2009, p. 72371U-1-8.

Wa James Tam, Carlos Vazquez and Filippo Speranza, "Three-dimensional TV: A novel method for generating surrogate depth maps using colour information," SPIE-IS&T, Feb. 2009, p. 72371A-1-9, vol. 7237.

Donghyun Kim, Dongbo Min and Kwanghoon Sohn, A Stereoscopic Video Generation Method Using Stereoscopic Display Characterization and Motion Analysis, IEEE Transactions on Broadcasting, Jun. 2008, p. 188-197, vol. 54, No. 2.

Japan Patent Office, Office Action, Jan. 31, 2012 (with English summary).

Hideki Hayakawa et al., "The Integration of Edge and Shading Information for 3D Shape Estimation", IEICE Technical Report, Sep. 21, 1992, pp. 45-52, vol. 92, No. 230.

Hideki Hayakawa et al., "3D Shape Estimation from Shading and Edge Information", ITEJ Technical Report, Nov. 26, 1992, pp. 25-30, vol. 16, No. 79.

Korea Patent Office, Office Action, May 11, 2012 (with English summary).

Office Action of Counterpart Taiwan Application 099143219, dated Aug. 12, 2013.

\* cited by examiner

| Line1 | Line 2 | Line 3 | Line 4 | Line 5 | Line 6 | Line 7 | Line 8 | Line 9 | Line 10 |
|---|---|---|---|---|---|---|---|---|---|
| 20 | 50 | 70 | 120 | 40 | 60 | 180 | 30 | 20 | 80 |

Table 310

| Line1 | Line 2 | Line 3 | Line 4 | Line 5 | Line 6 | Line 7 | Line 8 | Line 9 | Line 10 |
|---|---|---|---|---|---|---|---|---|---|
| 20 | 70 | 140 | 260 | 300 | 360 | 540 | 570 | 590 | 670 |

Table 320

| Line1 | Line 2 | Line 3 | Line 4 | Line 5 | Line 6 | Line 7 | Line 8 | Line 9 | Line 10 |
|---|---|---|---|---|---|---|---|---|---|
| 8 | 27 | 53 | 99 | 114 | 137 | 205 | 217 | 224 | 255 |

Table 330

| | Pixel 1 | Pixel 2 | Pixel 3 | Pixel 4 | Pixel 5 | Pixel 6 | Pixel 7 | Pixel 8 | Pixel 9 |
|---|---|---|---|---|---|---|---|---|---|
| Line Num | 1 | 2 | 3 | 4 | 5 | 6 | 7 | 8 | 9 |
| Y | 1 | 10 | 40 | 80 | 125 | 140 | 200 | 235 | 10 |
| Cb | 255 | 240 | 220 | 180 | 145 | 100 | 60 | 25 | 255 |
| Cr | 30 | 70 | 210 | 255 | 1 | 90 | 130 | 180 | 50 |
| F(Y) | 0.8 | 0.82 | 0.86 | 0.93 | 1 | 1.02 | 1.11 | 1.17 | 1.20 |
| F(Cb) | 0.9 | 0.91 | 0.93 | 0.96 | 0.99 | 1.02 | 1.05 | 1.08 | 1.10 |
| F(Cr) | 0.77 | 0.86 | 1.19 | 1.30 | 0.70 | 0.91 | 1.01 | 1.12 | 0.82 |
| G | 8 | 27 | 53 | 99 | 114 | 137 | 205 | 224 | 255 |
| Depth | 4 | 17 | 51 | 114 | 79 | 130 | 242 | 318 | 275 |

Table 340

| | Pixel 1 | Pixel 2 | Pixel 3 | Pixel 4 | Pixel 5 | Pixel 6 | Pixel 7 | Pixel 8 | Pixel 9 |
|---|---|---|---|---|---|---|---|---|---|
| Norm-depth | 3 | 14 | 41 | 91 | 63 | 104 | 194 | 255 | 220 |

Table 350

Fig. 3

DEPTH MAP GENERATION FOR A VIDEO CONVERSION SYSTEM

CROSS REFERENCE TO RELATED APPLICATION

The present application claims the benefit of priority of the following commonly-owned, presently-pending provisional application: application Ser. No. 61/286,397, filed Dec. 15, 2009, entitled "Video Conversion System," of which the present application is a non-provisional application thereof. The disclosures of the forgoing application are hereby incorporated by reference in it entirely, including any appendices or attachments thereof, for all purposes.

BACKGROUND OF THE INVENTION

1. Field of the Invention

Embodiments of the present invention relate generally to display technologies and more specifically to depth map generation methods and video conversion methods and systems.

2. Description of the Related Art

Unless otherwise indicated herein, the approaches described in this section are not prior art to the claims in this application and are not admitted to be prior art by inclusion in this section.

A three-dimensional (3D) image or 3D video may provide the illusion of depth perception. Conventional 3D technologies may be based on stereoscopic photography, which may require a special camera to capture images from two lenses. To play-back the 3D stereoscopic image or video, special hardware and/or eye glasses may be required to provide the illusion of depth for the viewers by simultaneously displaying two images that mimic the perspectives of human eyes. Although 3D displays offer spectacular visual experience and benefit to many applications, such as broadcasting, movie, gaming, and photography, there currently lacks an effective approach to generate 3D content.

In addition, for two-dimensional (2D) images or 2D video that have been captured using conventional 2D hardware, the conventional 3D display hardware and/or 3D eye glasses may lack the ability to display 3D effects from these 2D content. Thus, before showing 3D effects using 3D display hardware, the 2D images may need to be converted into 3D images, and the 2D video may also need to be converted into 3D video. However, conventional techniques for converting 2D images/video to 3D images/video often rely on object-based segmentation and motion compensation techniques, which require significant computing resources to carry out.

SUMMARY

In accordance with one or more embodiments of the present disclosure, a process for generating a depth map for converting a two-dimensional (2D) image to a three-dimensional (3D) image may be presented. The process may be implemented to generate a depth gradient map from the 2D image, wherein the depth gradient map is configured to associate one or more edge counts with one or more depth values. The process may extract an image component from the 2D image, wherein the image component is associated with a color component in a color space. The process may determine a set of gains to adjust the depth gradient map based on the image component. And the process may further generate the depth map by performing depth fusion based on the depth gradient map and the set of gains.

In accordance with other embodiments of the present disclosure, a process for converting a two-dimensional (2D) video to a three-dimensional (3D) video may be present. The process may be implemented to select a first 2D image from the 2D video and generate a first depth gradient map associated with the first 2D image. The process may select a second 2D image from the 2D video, wherein the second 2D image is subsequent to the first 2D image. The process may generate a first depth map by performing depth fusion using the first depth gradient map and the second 2D image. And the process may convert the second 2D image to a first 3D image for the 3D video using the first depth map.

In accordance with further embodiments of the present disclosure, a system may be configured to generate a depth map for video conversion. The system may contain a depth gradient map generator for generating a depth gradient map based on a 2D image. The system may contain a depth refinement engine for extracting one or more image components from the 2D image and determining one or more sets of gains respectively based on the one or more image components. And the system may further contain a depth fusion engine, coupled with the depth gradient map generator and the depth refinement engine, for generating the depth map by performing depth fusion based on the depth gradient map and the one or more sets of gains.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 3 shows scenarios of the intermediate results generated by illustrative embodiments during generating of a depth map;

DETAILED DESCRIPTION

Figure 1:
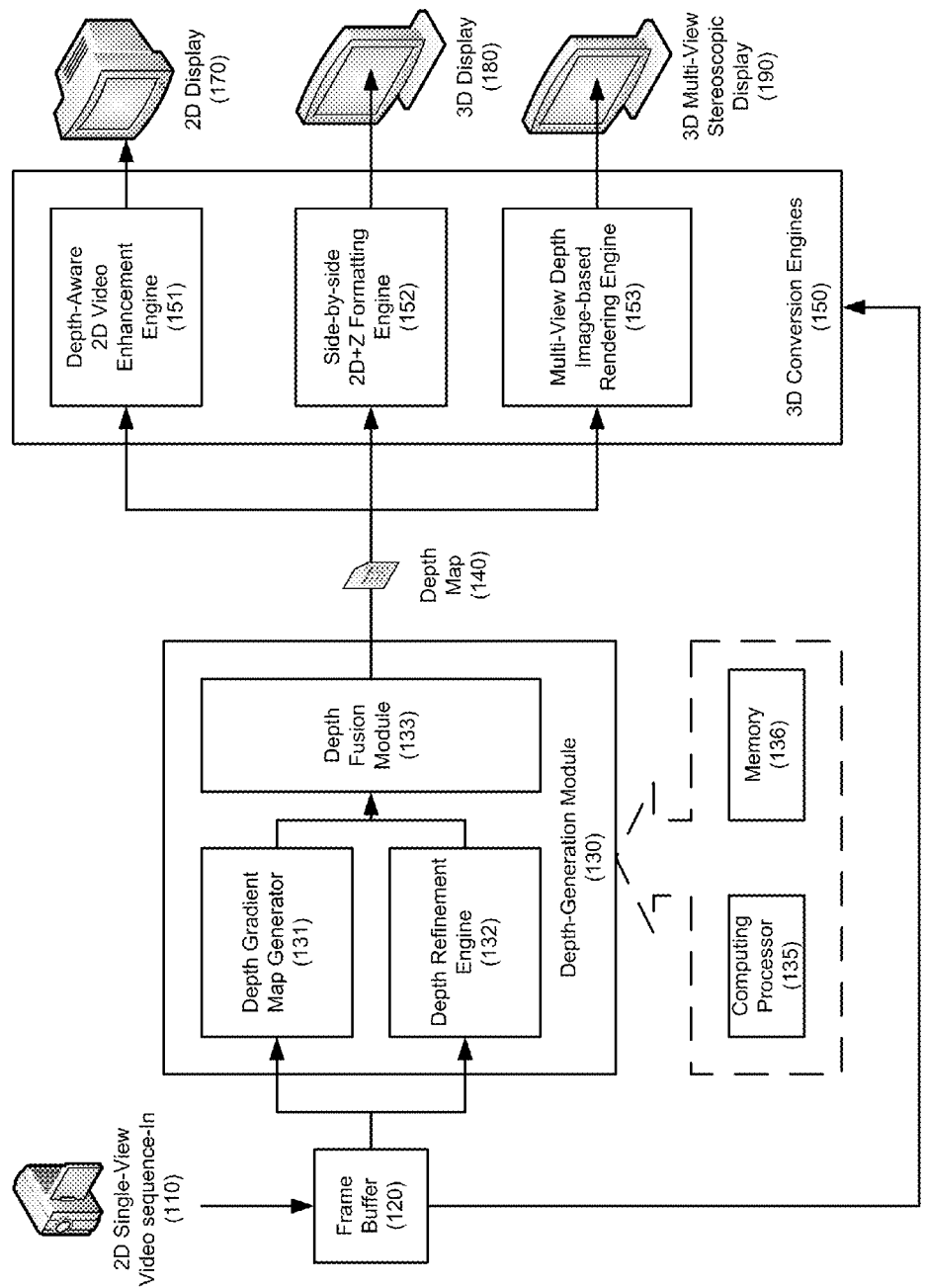
FIG. 1 shows a block diagram with illustrative embodiments of a video conversion system for performing 3D conversion.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present invention, as generally described herein, and illustrated in the Figures, can be arranged, substituted, combined, and designed in a wide variety of different configurations, all of which are explicitly contemplated herein.

This disclosure is drawn, inter alia, to methods, apparatus, computer programs and systems related to the generating of a depth map for video conversion. In one embodiment, a depth-generation module may process a 2D image in order to generate a depth map. A 3D conversion engine may then use the depth map to convert the 2D image into a 3D image. To generate the depth map, a depth gradient map generator of the depth-generation module may generate a depth gradient map from the 2D image. A depth refinement module of the depth-generation module may extract one or more image components from the 2D image and determine a set of gains to adjust the depth gradient map for enhancing the depth characteristics of these one or more image components. A depth fusion module of the depth-generation module may perform depth fusion based on the depth gradient map and the set of gains to generate the depth map.

Throughout the disclosure, the term "depth map" may broadly refer to a data structure for storing depth values related to a 3D image or video. A 2D image may be displayed using 3D technology if each pixel within the 2D image can be assigned with an associated depth value. The depth value may relate to a distance from a pixel of an object to a viewing point. For example, the further away the object is from the viewing point, the larger the distance, and hence the depth value, between the object and the viewing point. The depth values for all the pixels in the 2D image may then be stored in the depth map. For example, if the 2D image has a resolution of 1024×768, the depth map may also include 1024×768 corresponding depth values for the pixels in the 2D image.

Throughout the disclosure, the term "gradient" may describe the "steepness" of the changes for a specific value. In some embodiments, the higher the gradient value, the bigger rate of changes for the specific value. For example, a gradient value may be used for storing the changing rate of depth values for the pixels in an image line. Thus, the higher the gradient value, the larger the differences between the depth value of one pixel and the depth value of the next pixel in the image line. The term "depth gradient map" may broadly refer to a data structure for storing the depth gradient values that are related to the depth values of the pixels in an image. In some embodiments, a depth gradient map may include the normalized accumulated edge counts derived from the image lines of the image.

Throughout the disclosure, the term "color space" may broadly refer to a color coding scheme used for storing 2D or 3D color images. The color space may be used to separate the color of each pixel into multiple color components. For example, a RGB color space may use a red (R) color component, a green (G) color component, and a blue (B) color component for storing the pixel's color. An YCbCr color space may use a Y color component to store the luminance of the pixel, a Cr color component to store the blue-difference of the pixel, and a Cb color component to store the red-difference of the pixel. A color component to a color space is similar to a color value to a color pixel. Thus, a color encoded using an YCbCr color space may have three "color values", a Y color value, a Cb color value, and a Cr color value. Alternatively, other color spaces using different color components may have similar or different number of color values to store the color of the pixel. Further, the term "image component" may broadly refer to the color values of a specific color component for all the pixels of an image. Thus, a Y image component of an image may store the Y color values of all pixels in the image.

Throughout the disclosure, the term "monotonic increasing refinement" may refer to the refining of a depth value based on a color value of a pixel, so that when the pixel is displayed with the refined depth value in a 3D environment, the depth characteristics of the object that the pixel is depicting may be enhanced. In some embodiments, the refinement may be accomplished by adjusting the depth value using a gain corresponding to the color value of the pixel. Throughout the disclosure, the term "depth fusion" may broadly refer to a specific type of calculation based on a depth gradient value and a gain. In some embodiments, the depth gradient value may be used as a base depth value for a pixel, and the color values of the pixel may be used to determine a set of gains. The set of gains may be used to adjust the base depth value.

FIG. 1 shows a block diagram with illustrative embodiments of a video conversion system for performing 3D conversion. In FIG. 1, a depth-generation module 130 and one or more 3D Conversion engine(s) 150 may be configured to convert a 2D video 110 to a 3D video for displaying on displays 170, 180, or 190. A frame buffer 120 may be used to store one or more 2D images fetched from the 2D video 110. The depth-generation module 130 may be configured to include, without limitation, a depth gradient map generator 131, a depth refinement engine 132, a depth fusion module 133, a computing processor 135, and/or a memory 136. The 3D conversion engines may be a depth-aware 2D video enhancement engine 151, a side-by-side 2D+Z formatting engine 152, or a Multi-View image-based rendering engine 153. Further, the displays that are capable of displaying 3D images may be, without limitation, a 2D display 170, a 3D display 180, or a 3D multi-view stereoscopic display 190.

In some embodiments, a 2D video 110 may be a video stream generated by 2D video capturing devices such as camcorders, or a video stream converted from a 2D movie. The 2D video 110 may contain multiple image frames each of which stores a still 2D color image. Each 2D image may have multiple color pixels configured based on a specific resolution. For example, a 2D image may have a 1024×768 resolution, meaning that the 2D image has 768 horizontal image lines, each of the image lines having 1024 pixels of color information. Other popular image resolutions may include, without limitation, 640×480, 1280×1024, or 1920×1200. In some embodiments, the 2D video 110 may be fed into a frame buffer 120. The frame buffer 120 may be a storage system for fast loading of 2D images from the 2D video 110. In some embodiments, the depth-generation module 130 and the 3D conversion engine(s) 150 may be configured to quickly access the 2D images stored in the frame buffer 120

In some embodiments, the depth gradient map generator 131 may be configured to retrieve a 2D image from the frame buffer 120 and generate a depth gradient map based on the 2D image. The depth refinement engine 132 may be configured to retrieve from the frame buffer 120 the same 2D image as the depth gradient map generator 131 and generate a set of gains based on the 2D image. In some implementations, the set of gains is in a monotonically increasing sequence. Based on the depth gradient map and the set of gains, the depth fusion module 133 may perform depth fusions to generate a depth map 140. The depth map 140 and the 2D image in the frame buffer 120 may then be transmitted to the 3D conversion engine(s) 150 for converting the 2D image into a 3D image. The details of the depth gradient map generator 131, the depth refinement engine 132 and the depth fusion module 133 are further described below.

In some embodiments, the depth-generation module 130 may utilize the computing processor 135 for generating the depth map 140. The computing processor 135 may be a microprocessor or any general or specific computing device that executes commands based on programmable instructions. In some embodiments, the computing processor 135 may utilize the memory 136 to execute the programmable instructions and store the intermediate processing results of the execution. The memory 136 may be in any form of random access memory (RAM), read-only memory (ROM), flash memory, conventional magnetic or optical disks, tape drives, or a combination of such devices.

In some embodiments, the 3D conversion engines 150 may retrieve a 2D image from the frame buffer 120, and use the depth map 140 for converting the 2D image into a 3D image. In some embodiments, the depth-aware 2D video enhancement engine 151 may enhance the depth characteristics of the 2D image based on the depth map 140. Specifically, the depth-aware 2D video enhancement engine 151 may improve the edge, contrast, and saturation of the 2D image. For example, an object in the 2D image may be enhanced by increasing or decreasing the contrast (or saturation etc.) associated with the object depending on whether each of the depth values is above or below a predetermined threshold. In other words, when a depth value is smaller than the threshold, it may be enhanced more than another depth value that is already larger than the threshold. The depth-aware 2D video enhancement engine 151 may be implemented by a suitable conventional technique, such as the technique disclosed in the U.S. patent application Ser. No. 12/242,672 and entitled "Depth-Based Image Enhancement" by Lian-Gee Chen, et al.

In some embodiments, the side-by-side 2D+Z formatting engine 152 may generate a 3D image (e.g., sequential Left/Right, anaglyph, or polarization image) having a specific depth map to show whether each pixel of the image should be displayed in-front-of or behind the screen plane. The multi-view depth image-based rendering engine 153 may create 2D images in different viewing points that are similar to the ones generated by multiple cameras simultaneously capturing images from multiple perspectives.

In some embodiments, the 3D images generated by the 3D conversion engines 150 may be displayed by various 2D or 3D displaying devices. For example, a 2D display 170 may be able to process a 2D image based on the depth map 140 and display the image in a 2D fashion. A 3D display 180 may utilize auto-stereoscopic technology to display pixels in different colors and intensities based on different viewing angles. For the 3D display 180, the viewer may wear a shutter glasses for sequential Left/Right image, a red/cyan glasses for anaglyph image, or a polarization glasses for polarization image. And a 3D multi-view stereoscopic display 190 may display a 3D image which is generated based on 2D images in different viewing points. The 3D multi-view stereoscopic display 190 has barrier or lenticular panel so that the viewer can directly enjoy the sight of 3D illusion in bare eyes.

In some embodiment, the depth-generation module 130 may control the depth gradient map generator 131 and the depth refinement engine 132 to perform their respective operations in parallel. For optimized performance, the depth refinement engine 132 may utilize a depth gradient map generated from a first 2D image to refine a second 2D image, which is related to, but nevertheless different from, the first 2D image. The details about the optimized and/or parallel processing are further described below.

Figure 2:
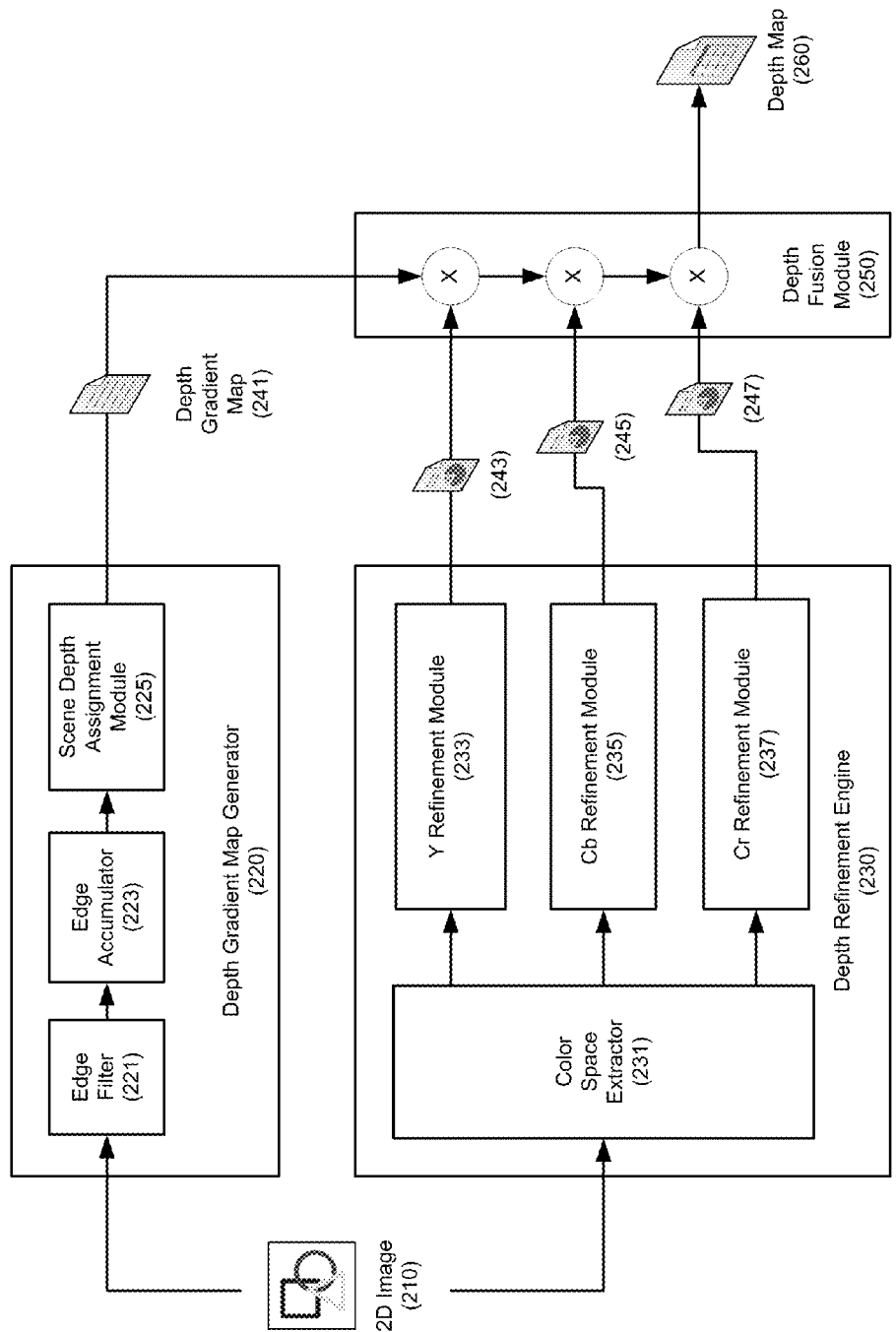
FIG. 2 shows illustrative embodiments of a depth-generation module being implemented to generate a depth map for 3D conversion.

FIG. 2 shows illustrative embodiments of a depth-generation module being implemented to generate a depth map for 3D conversion. In FIG. 2, a depth-generation module similar to the depth-generation module 130 of FIG. 1 may contain a depth gradient map generator 220 (similar to the depth gradient map generator 131 of FIG. 1), a depth refinement engine 230 (similar to the depth refinement engine 132 of FIG. 1), and a depth fusion module 250 (similar to the depth fusion module 133 of FIG. 1). The depth generation module may generate a depth map 260 based on a 2D image 210, which may be retrieved from a frame buffer (not shown in FIG. 2). The depth gradient map generator 220 may contain, among other things, an edge filter 221, an edge accumulator 223, and a scene depth assignment module 225. The depth refinement engine 230 may contain, among other things, a color space extractor 231, one or more image component refinement modules 233, 235, and/or 237.

In some embodiment, the edge filter 221 may detect a number of edges by processing the 2D image 210 one image line at a time in an orderly fashion. For example, the edge filter 221 may read the image lines in the 2D image 210 in a top-down or bottom-up, interlaced or non-interlaced order. For each image line, the edge filter 221 may orderly evaluate the pixels within the image line, and detect an edge if the pixels next to each other have characteristic variations that exceed some predetermined thresholds. The variations may be based in color or brightness. For example, the edge filter 221 may determine that if the color variations between the two adjacent pixels are greater than a color variation threshold, then there might be an edge present in the current image line. Likewise, the edge filter 221 may filter the image line based on the brightness/luminance level of each pixel. If a pixel has a higher or lower luminance level than the next pixel (in other words, the pixel is brighter or dimmer than the next pixel), and the luminance level variations may exceed a predetermined luminance threshold, then the edge filter 221 may conclude that an edge is detected in the current image line.

After all the pixels in the image line are evaluated and compared with their respective adjacent pixels, the edge filter 221 may add up the number of detected edges as an edge count, and associated the edge count with the image line. Afterward, the edge filter 221 may orderly pick another image line from the 2D image, and continue its processing till each image line of the 2D image has a corresponding edge count. The end result may resemble a table similar to table 310 of FIG. 3, in which each line may have a corresponding edge count value. The end result may also be transmitted to the edge accumulator 223 for further processing.

In some embodiments, the edge accumulator 223 may calculate an accumulated edge count for each image line of the 2D image 210. Generally, the human viewing perception tends to interpret the top half of the 2D image 210 to be further away from the viewer point, and the bottom half of the 2D image 210 to be closer to the viewing point. This is usually true since in some 2D images 210, the sky may tend to occupy the top part, and the earth may tend to be at the bottom part. Thus, under such an assumption, the depth gradient map generator 220 may build an initial depth map for a 2D image by assign a higher depth gradient to the image lines that are more toward the bottom of the 2D image 210. In other words, a second image line, which is below a first image line in the 2D image 210, may be assumed to be closer to the viewing point than the first image line. Based on this assumption and the assumption that edges being associated with depth, the edge accumulator 223 may add the edge count of the first image line to the edge count of the second image line, thereby ensuring that the second image line having more edge counts than the first image line. Such an approach may allow the second image line to be shown closer to the viewing point than the first image line in a 3D display. The generated 3D effect may be valid even when the first image line and the second image line are adjacent to each other.

In some embodiments, for a specific image line in the 2D image 210, the edge accumulator 223 may accumulate the edge counts of all the "distant" image lines, which are "farther away" than the specific image line, to the edge count of the specific image line, so that this specific image line may have more edge counts than any of these "distant" image lines. When the 2D image 210 is under a top-far, bottom-near assumption, any image lines that are "farther away" may be the image lines that are "above" the specific image line in the 2D image 210. For the "most-bottom" image line of the 2D image 210, the edge accumulator 233 may add edge counts of all the image lines in the 2D image 210 to a total edge count, and assign the total edge count as the accumulated edge count for the "most-bottom" image line.

The above approach may generate an output that is similar to table 320 of FIG. 3, in which each specific image line may be associated with an accumulated edge count. Each accumulated edge count may include the sub-total of all the edge counts of the image lines that are "above" the specific image line. In some embodiments, the depth gradient map generator 220 may determine that the 2D image 210 should be displayed with the top half of the 2D image 210 being closer to the viewing point than its bottom half. In this case, the edge accumulator 223 may accumulate the edge counts of the image lines in different orders, e.g., by add the edge counts of the "bottom" image lines to the "top" image lines. Thus, the edge accumulator 223 may provide an output table in which any image line may not have more accumulated edge count than any other "closer" image lines. The details of edge accumulation are further described below.

In some embodiments, the scene depth assignment module 225 may perform normalization on the accumulated edge count for each image line of the 2D image 210. Since the color value for many color space may have a range from 0 to 255 (i.e., the color value is a 8-bit value), a depth value in a depth map may be normalized to a similar range of 0 to 255, with 0 representing being the furthest, and 255 representing being the closest. In the depth gradient map generated by the edge accumulator 223, the accumulated edge count, which would be deemed a depth gradient value, may have a range from 0 to a number that may be higher or lower than 255. The scene depth assignment module 225 may determine a normalization rate to normalize these accumulated edge counts, so that the image line that is deemed the closest to the viewing point of the 2D image 210 may have a normalized edge count of 255. The other accumulated edge counts may be proportionally scaled up or down based on the same normalization rate. After finished its operation, the scene depth assignment module 225 may generate a depth gradient map 241 as an output. In some embodiments, the scene depth assignment module 225 may be omitted from the depth gradient map generator 220 or may perform normalization on the depth map 260 generated by the depth fusion module 250.

In some embodiments, the depth gradient map 241 may have the same number of depth gradient values as the number of image lines in the 2D image 210, which is defined by the resolution of the 2D image 210. For example, if the 2D image 210 has a 1024×768 resolution, then the depth gradient map 241 may have 768 entries. The last entry of the depth gradient map 241 may be normalized to 255. Furthermore, each entry in the depth gradient map 241 may be associated with a corresponding image line of the 2D image 210, representing a depth gradient value that is deemed as an initial depth value for all the pixels in the same image line. In other words, the depth gradient map 241 may provide initial depth values for the image lines of the 2D image 210.

In some embodiments, the color space extractor 231 may process the 2D image 210 and extract one or more image components from the 2D image 210. The color space extractor 231 may determine which color space the 2D image 210 is encoded with, and extract the image components corresponding to the color components of the color space. For example, upon a determination that the 2D image 210 is encoded using an YCbCr color space, the color space extractor 231 may extract three image components (a Y image component, a Cb image component, and a Cr image component) from the 2D image 210. Once extracted, the Y image component may contain the Y color values, the Cb image component may contain the Cb color values, and the Cr component may contain the Cr color values of all the pixels in the 2D image 210.

In some embodiments, the Y image component extracted by the color space extractor 231 may be transmitted to the Y refinement module 233, the Cb image component to the Cb refinement module 235, and the Cr image component to the Cr refinement module 237. When another color space (e.g., RGB color space) is used for encoding the 2D image 210, the depth refinement engine 230 may contain additional image component refinement modules (e.g., a R refinement module, a G refinement module, and/or a B refinement module) to process the R, G, and/or B image components extracted by the color space extractor 231.

In some embodiments, the color and brightness of a pixel in the 2D image 210 may have certain depth characteristics. Specifically, human viewing perception may associate a specific color or brightness of an object in the 2D image 210 to the distance between the object and the viewing point of the 2D image 210. For example, the warm color (e.g., red color) may be perceived as being close, and the cold color (e.g., blue) may be perceived as being far away. Or, an object with a high luminance may be perceived to be closer than another object with a low luminance in the 2D image 210. In the YCbCr color space, the Y color component may store the luminance information of a pixel. The Cr color component may be a chroma component for storing red-difference, and the Cb color component may also be a chroma component for storing blue-difference for the pixel. Thus, to enhance the depth characteristics of the YCbCr color space, the image component refinement modules 233, 235 and 237 may generate a set of gains in order to making the bright-colored pixel appear closer, dim-colored pixel appears farther, warm-colored pixel closer, and cold-colored pixel farther.

In some embodiments, the Y refinement module 233 may determine a first gain corresponding to each of the Y color values in the Y image component. This set of the first gains may be in a linear increasing sequence ranging broadly from $Y_{base}-Y_{th}$ to $Y_{base}+Y_{th}$, with the $Y_{base}$ being an adjustable value. For example, the linear increasing sequence may range from $1-Y_{th}$ to $1+Y_{th}$. The $Y_{th}$ may be a variable for adjusting the linear increasing sequence. In other words, for a specific Y color value that can be in a range from 0 to 255, the first gain corresponding to the specific Y color value may fall within a range from $1-Y_{th}$ to $1+Y_{th}$. For example, when a Y color value is 0, the first gain for Y may be $1-Y_{th}$. When a Y color value is 128, the first gain for Y may be 1. When a Y color value is 255, the first gain may be $1+Y_{th}$. In some embodiments, the $Y_{th}$ variable may be a variable which is determined based on different conditions (or applications).

In some embodiments, the first gains for all the Y color values in the Y image component may be stored in a Y gain set 243. Each of the first gains in the Y gain set 243 may be associated with a pixel in the 2D image 210. Thus, the Y gain set 243 may also include the location of the specific pixel (e.g., on which image line and at which position on the image line). As mentioned, since the first gain may be determined based on a Y color value, which may be extracted from the specific pixel, the Y gain set 243 may have an equal number of entries as the number of Y color values in the Y image component and also have an equal number of entries as the number of pixels in the 2D image 210.

In some embodiments, the Cb refinement module 235 may determine a second gain corresponding to each Cb color value in the Cb image component. The range of the linear gain can be expressed broadly from $Cb_{base}+Cb_{th}$ to $Cb_{base}-Cb_{th}$, with the $Cb_{base}$ being an adjustable value. This set of the second gains may be in a range, for example, from $1+Cb_{th}$ to $1-Cb_{th}$, for Cb color values ranging from 0 to 255. The $Cb_{th}$ may be a variable which is determined based on different conditions (or applications). The Cb refinement module 235 may place all the second gains in a Cb gain set 245. In the Cb gain set 245, each of the second gains may be associated with a pixel in the 2D image 210.

In some embodiment, the Cr refinement module 237 may perform similar operations to the Cr image component as the Y refinement module 233. Specifically, the Cr refinement module 237 may determine a third gain corresponding to each Cr color value in the Cr image component. The range of the linear gain can be expressed broadly from $Cr_{base}-Cr_{th}$ to $Cr_{base}+Cr_{th}$, with the $Cr_{base}$ being an adjustable value. This set of the third gains may be in a range, for example, from $1-Cr_{th}$ to $1+Cr_{th}$, for Cr color values ranging from 0 to 255. The $Cr_{th}$ may be a variable which is determined based on different conditions (or applications). The Cr refinement module 237 may place all the third gains in a Cr gain set 247. In the Cr gain set 247, each of the third gains is associated with a pixel in the 2D image 210.

In some embodiments, the depth gradient map 241, the Y gain set 243, the Cb gain set 245, and the Cr gain set 247 may be transmitted to the depth fusion module 250 for further operations. The depth fusion module 250 may apply the normalized edge counts to the Y gain set 243 to generate a first output. This first output may then be applied to the Cb gain set 245 to generate a second output. The second output may further be applied to the Cr gain set 247. After the depth fusion operations, the depth fusion module 250 may output the depth map 260 for subsequent 3D conversion operations.

Specifically, the depth fusion module 250 may first select a specific depth gradient value from the depth gradient map 241 and determine the image line from which the normalized depth gradient value is calculated. The depth fusion module 250 may then select a specific first gain from the Y gain set 243, a specific second gain from the Cb gain set 245, and a specific third gain from the Cr gain set 247. The first, second, and third gains are associated with a specific pixel located on the previously determined image line. The depth fusion module 250 then may perform depth fusion based on the aforementioned first, second, and third gains and the specific normalized depth gradient value. The output of the depth fusion may correspond to a depth value for the specific pixel in the depth map 260. The depth fusion module 250 continues the above depth fusion operations till each pixel in the 2D image 210 has a corresponding depth value in the depth map 260. The details of the depth fusion operations are further described below.

FIG. 3 shows scenarios of the intermediate results generated by illustrative embodiments during generating of a depth map. In FIG. 3, table 310 may be an example output scenario after a 2D image has been processed by the edge filter 221 of FIG. 2. Table 320 may be an example output scenario after the edge accumulator 223 of FIG. 2 processed the table 310. Table 330 may be an example output scenario after the scene depth assignment module 225 of FIG. 2 processes the table 320. Table 340 may be an example output scenario after the depth fusion module 250 of FIG. 2 processes the table 330 and some examples gains generated from the image components. Table 350 may be an example output scenario after the depth fusion module 250 of FIG. 2 normalizes the depth values in the table 340.

In table 310, a 2D image with 10 image lines may have been loaded into a frame butter. The edge filter may process the 2D image line by line and count a number of edges for each of the image lines. In the table 310 and other subsequent tables in FIG. 3, line 1 may represent the first image line from the top of the 2D image, line 2 may represent the second image line from the top of the 2D image, and line 10 may represent the last line (or the most bottom line) of the 2D image. In table 310, the edge filter may have detected 20 edges in line 1, 50 edges in line 2, and so on.

Based on the table 310, the edge accumulator may accumulate the edge count of a specific image line with a sub-total of the edge counts of all the previous image lines, and store the accumulated edge counts in the table 320. In table 320's example, the accumulated edge count for a specific image line may be quickly calculated by adding all the "above" image lines' edge counts (as a sub-total edge count), plus the specific image line's own edge count. For example, for line 5, the accumulated edge count may equal the sub-total edge count of line 1, line 2, line 3, and line 4, plus line 5's own edge count, assuming line 1, line 2, line 3 and line 4 are all "above" lines of the line 5 in the 2D Image. Therefore, the accumulated edge count should be (20+50+70+120)+40=300. After all the image lines are processed by the edge accumulator, the table 320 may be used to store the accumulated edge counts for all the image lines. In table 320, the first line (line 1) may have the least amount of edges, and may be deemed to be the farthest away from the viewing point. The last line (line 10), which may have the most edges, may be deemed to be closest to the viewing point.

In some embodiments, the scene depth assignment module may process the table 320 to generate a normalized accumulated edge count table 330. The scene depth assignment module may assign a value 0 to mean the farthest away from the viewing point, and a value 255 to mean the closed to the viewing point. Since the last line (line 10) may be deemed closest, its normalized accumulated edge count may be assigned with the value 255. Based on the last image line, the previous image lines may be normalized by a ratio equalling to 255/(accumulated edge count for the last image line). In the table 320's scenario, the accumulated edge count for line 10 is 670, then all the accumulated edge counts in the table 320 may be normalized by a 255/670 ratio.

For example, for line 1, the normalized accumulated edge count may be 20*255/670=8. For line 5, the normalized accumulated edge count may be 300*255/670=114. Table 330 may store the "normalized accumulated edge counts" (i.e., depth gradient values) for the image lines after applying the normalization ratio to the accumulated edge counts in the table 320, and may be deemed a depth gradient map. The more edge complexity in an image line, the more depth gradient this image line may have. Thus, this approach is advantageous since the output 3D image may have a sharp depth change between object and smooth blue sky, and a sharp depth change between an upper-boundary of defocus background and in-focus object.

In some embodiments, a color space extractor may extract the 2D image into Y, Cb, and Cr image components. For each color value in these image components, a corresponding gain may be determined for refinement purposes. To illustrate, in table 340, pixel 1 may be from line 1, and may have a Y color value of 1, a Cb color value of 255, and a Cr color value of 30. Based on these color values, a first gain (e.g., F(Y)), a second gain (e.g., F(Cb)), and a third gain (e.g., F(Cr)) may be determined by the refinement modules. Further, the depth gradient values (G) for each image line are also copied from table 330.

It should be noted that that all pixels in the same image line may use the same depth gradient value corresponding to the image line.

In some embodiment, a formula F(Y) may provide a linear gain ranging from $1-Y_{th}$ to $1+Y_{th}$, for Y color values ranging from 0 to 255. In other words, if a pixel has a Y color value of 0, it may be assigned with a $1-Y_{th}$ gain. For a Y color value of 255, it may be assigned with a $1+Y_{th}$ gain. Thus, $$F(Y)=(1-Y_{th})+(2*Y_{th}*Y)/255\ (0 \le Y \le 255)$$

Likewise, a formula F(Cb) and F(Cr) may be similarly determined:

$$F(Cb)=(1+Cb_{th})-(2*Cb_{th}*Cb)/255\ (0 \le Cb \le 255)$$

$$F(Cr)=(1-Cr_{th})+(2*Cr_{th}*Cr)/255\ (0 \le Cr \le 255)$$

In the illustrated table 340, $Y_{th}$ is set to be 0.2, $Cb_{th}$ is set to be 0.1, and $Cr_{th}$ is set of 0.3 for calculating the various gains for the Y, Cb and Cr color values.

In some embodiments, a depth fusion module may perform depth fusion using the depth gradient map (e.g., the G value in table 340), and the one or more first gains, second gains, and third gains (e.g., the F(Y), F(Cb), and F(Cr) values shown in table 340). The depth fusion may utilize a formula similar to G*F(Y)*F(Cb)*F(Cr) for calculating a depth value for each pixel. After the depth values for all the pixels are calculated based on the depth fusion formula, the output depth values may be deemed a depth map for 3D conversion. In table 340's example, the depth value for pixel 3 may be equal to 53*0.86*0.93*1.19=51.

In some embodiments, the depth fusion module may normalize the depth values for the pixel values, so that the normalized values may be within a range of 0 to 255 for the 8-bit depth values. The normalization process may select the largest depth value from table 340, and adjust all the depth values accordingly. To illustrate, in table 340, the largest depth value before normalization is 318 for pixel 8. Thus, the normalized depth value for pixel 3 may be equal to 51*255/318=41. After the depth values of table 340 are normalized, the result is shown in table 350, in which each pixel may have a corresponding normalized depth value that is within a range of 0 to 255. In other words, the table 350 may be deemed a depth map for the 9 pixels of a 2D image.

Figure 4:
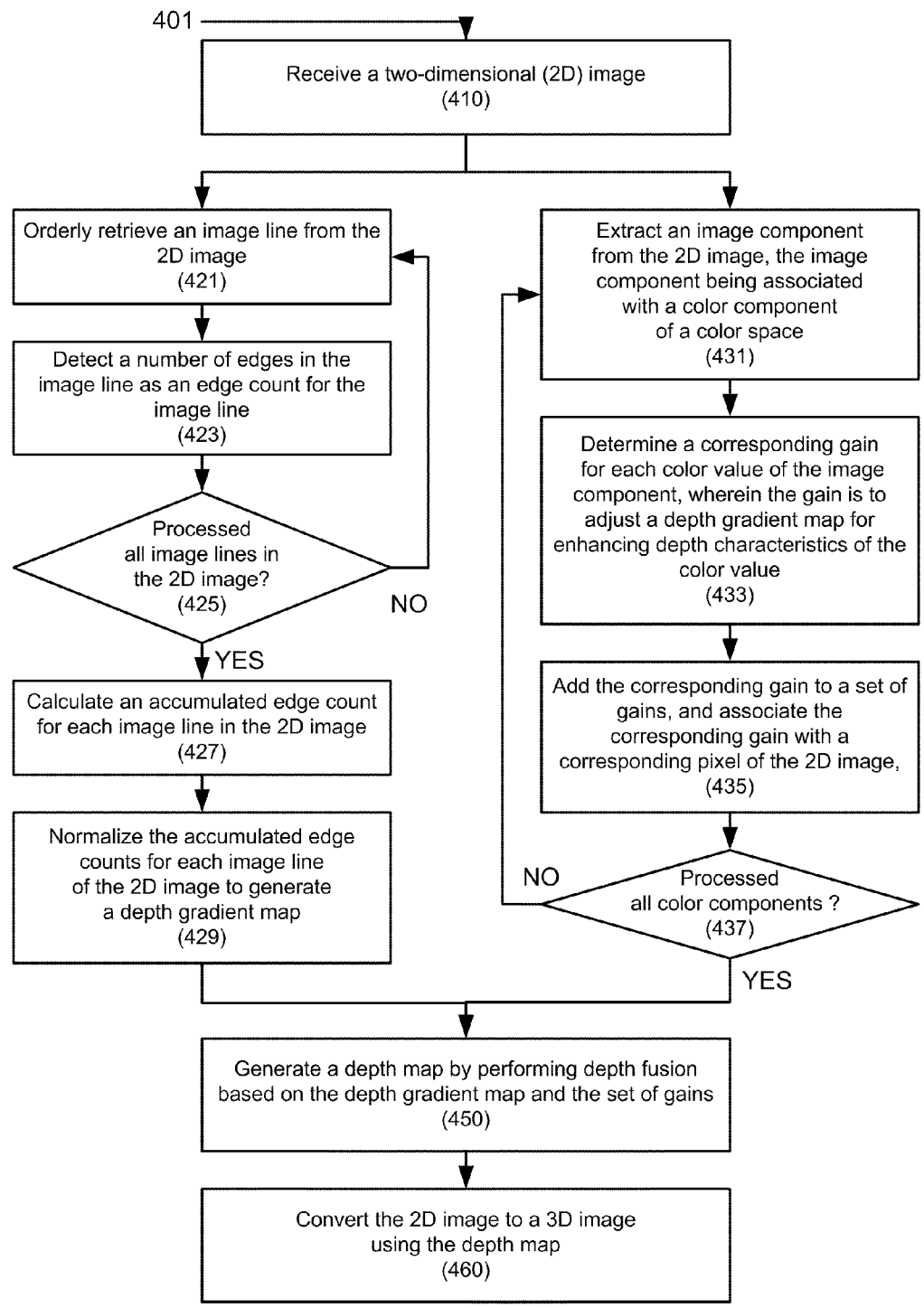
FIG. 4 shows a flow diagram of an illustrative embodiment of a process for generating a depth map from a 2D image.

FIG. 4 shows a flow diagram of an illustrative embodiment of a process 401 for generating a depth map from a 2D image. The process 401 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 4 may be practiced in various implementations. In some embodiments, machine-executable instructions for the process 401 may be stored in memory, executed by a processing unit, and/or implemented in a mobile device, such as the depth generation module 130 of FIG. 1.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 410, a depth-generation module may process a 2D image for 3D conversion by retrieving the 2D image from a frame buffer. In some embodiments, a depth gradient map generator of the depth-generation module may process the 2D image through blocks 421, 423, 425, 427, and 429. And a depth refinement module of the depth-generation module may process the 2D image through blocks 431, 433, 435, and 437. In some embodiments, the route through blocks 421, 423, 425, 427, and 429 may be processed in parallel to the route through blocks 431, 433, 435, and 437. In other words, the depth gradient map generator and the depth refinement module may independently and concurrently perform their respective operations, and their respective outputs may be transmitted to block 450 for further processing.

At block 421, an edge filter of the depth gradient map generator may orderly process the 2D image line-by-line. In some embodiments, the edge filter may retrieve a horizontal or vertical image line from the 2D image. The edge filter may also process the 2D image in a top-down, bottom-up, left-right, right-left order. Further, the edge filter may use an interlaced (skipping) or non-interlaced (sequential) processing order.

At block 423, for each image line being processed, the edge filter may detect a number of edges in the image line. The detected number of edges may be deemed an edge count for the image line.

At block 425, the edge filter may determine wither all image lines in the 2D image has been processed. If the answer is "NO", process 401 may return to block 421, in which another image line is retrieved from the 2D image for processing. If the answer at block 425 is "YES", process 401 may proceed to block 427.

At block 427, an edge accumulator may accumulate the edge counts of the "above" image lines for each image line in the 2D image. A corresponding accumulated edge count may be assigned to each image line.

At block 429, a scene depth assignment module may normalize the accumulated edge counts for all the image lines of the 2D image, and generate a depth gradient map for further processing by block 450.

At block 431, a color space extractor may extract one or more image components from the 2D image. Each of the image components may be associated with a color component of a color space. For example, a Y image component may be associated with a Y color component of an YCbCr color space. An R image component may be associated with a red (R) color component of a RGB color space.

At block 433, the image component may be transmitted to a corresponding image component refinement module to determine gains. In some embodiments, for each color value in the image component, the refinement module may determine a corresponding gain. Since each color value may have a value ranging, for example, from 0 to 255, the corresponding gain may be changing accordingly. For example, for Y color values, the gain may be in a range from $1-Y_{th}$ to $1+Y_{th}$.

At block 435, for each color value in the image component, the corresponding refinement module may add the gain to a certain gain set and associate the gain with a pixel of the 2D image. Thus, the gain set may include the position of the pixel from which the corresponding gain is determined.

At block 437, the depth refinement engine may determine whether all the image components have been adjusted. If the answer is "NO", process 401 may proceed to block 431, in which another image component may be extracted from the 2D image for further processing. If the answer at block 437 is "YES", process 401 may proceed to block 450.

At block 450, the depth-generation module may generate a depth map by performing depth fusion based on the depth gradient map generated at block 429 and the set of gains generated via the route of blocks 431-433-435-437. In some embodiments, the depth fusion may be performed based on a multiplication formula. The generated depth map may have a corresponding depth value for each pixel of the 2D image.

At block 460, a 3D conversion engine may convert the 2D image to a 3D image based on the depth map.

Figure 5:
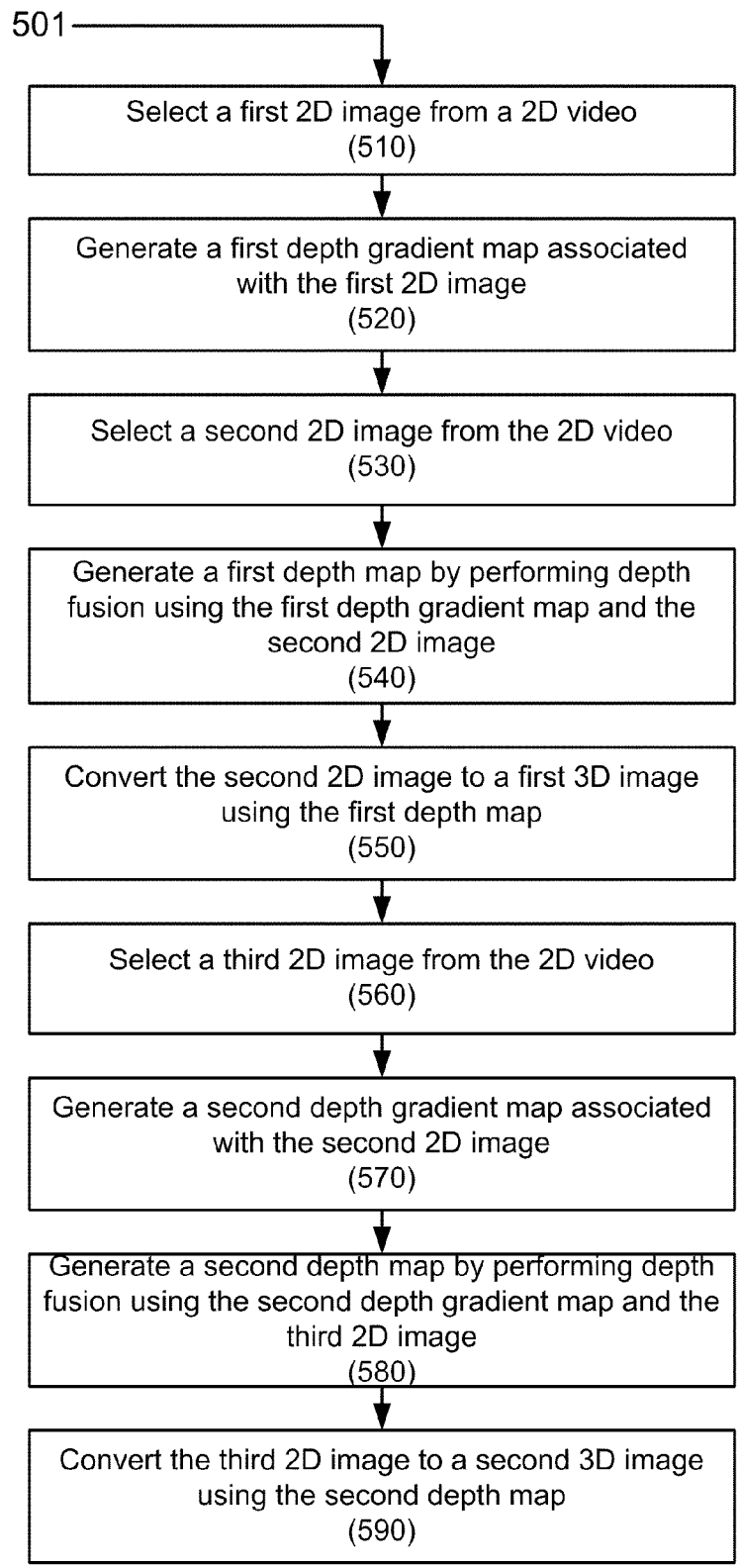
FIG. 5 shows a flow diagram of an illustrative embodiment of a process for optimizing the 3D video conversion process.

FIG. 5 shows a flow diagram of an illustrative embodiment of a process 501 for optimizing the 3D video conversion process. The process 501 set forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations. In some embodiments, machine-executable instructions for the process 501 may be stored in memory, executed by a processing unit, and/or implemented in a depth-generation module of FIG. 1.

At block 510, a depth-generation module may select a first 2D image from a 2D video for 3D conversion. The 2D video may be loaded into a frame buffer, allowing the depth-generation module to quickly retrieve one or more 2D images.

At block 520, a depth gradient map generator of the depth-generation module may process the first 2D image and generate a first depth gradient map associated with the first 2D image.

At block 530, the depth-generation module may select a second 2D image from the 2D video for 3D conversion. In some embodiments, the second 2D image may be subsequent to the first 2D image in the 2D video. The second 2D image may also be any other 2D image in the 2D video, as long as there are no significant differences between the first 2D image and the second 2D image.

At block 540, a depth fusion module of the depth-generation module may generate a first depth map by performing depth fusion using the first depth gradient map and the second 2D image. Specifically, a depth refinement engine of the depth-generation module may first process the image components of the second 2D image and generate multiple image component gain sets. The depth fusion module may then use the image component gain sets and the depth gradient map for generating the first depth map. In other words, the depth-generation module may use the depth gradient map generated based on the first 2D image to generate depth maps for the first 2D image and/or the second 2D image. Such an approach may be advantageous since consecutive images in a video may not change much from one image to another. Thus, by using the depth gradient map generated from the first 2D image to process both the first 2D image and the second 2D image, the performance of the depth generation module may be greatly enhanced.

At block 550, a 3D conversion engine may convert the second 2D image to a first 3D image using the first depth map generated at block 540. The 3D conversion engine may convert the first 2D image to another 3D image using the first depth map, if there are no significant differences between the first 2D image and the second 2D image. At block 560, the depth-generation module may select a third 2D image from the 2D video. At block 570, similar to block 520, the depth-generation module may generate a second depth gradient map associated with the second 2D image.

At block 580, similar to block 540, the depth fusion module of the depth-generation module may generate a second depth map by performing depth fusion using the second depth gradient map and the third 2D image. In some embodiments, the block 540 and/or the block 550 may be performed in parallel as the block 570 is being performed. That is, the depth gradient map generator of the depth-generation module may generate the second depth gradient map from the second 2D image (block 570), at substantially the same time as the depth refinement engine and the depth fusion module of the depth-generation module generating the first depth map for the second 2D image (block 540), and/or as the 3D conversion engine converting the second 2D image to the first 3D image (block 550). Such an approach is advantageous since it transforms a two-step (the depth-gradient-map-generation step and the depth-fusion step) sequential operation into two single-step operations that may be processed in parallel. Each of the single-step operations may take half as long as the two-step sequential operation, thereby greatly improving the performance of the 3D conversion process.

At block 590, the 3D conversion engine may convert the third 2D image to a second 3D image using the second depth map generated at block 550. Thus, the depth gradient map generated from one 2D image may be used for converting the next 2D image in the 3D video. In some embodiments, the depth-generation module may employ a comparison operation to determine whether two adjacent 2D images are similar to each other. If the comparison operation determines that the two adjacent 2D images are similar, then the depth-generation module may utilize process 501 for optimized processing. Otherwise, the depth-generation module may convert a selected 2D image using only the depth gradient map generated from the selected 2D image.

Thus, methods and systems for depth map generation have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory machine-readable storage medium and may be executed by one or more general-purpose or special-purpose programmable microprocessors. A "machine-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a machine-accessible storage medium includes recordable/non-recordable media (e.g., read-only memory (ROM), random access memory (RAM), magnetic disk storage media, optical storage media, flash memory devices, etc.)

Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense.

We claim:

1. A method for generating a depth map for converting a two-dimensional (2D) image to a three-dimensional (3D) image, comprising:
   generating a depth gradient map from the 2D image, wherein the depth gradient map is configured to associate one or more edge counts with one or more depth values for the 2D image;
   extracting an image component from the 2D image, wherein the image component is associated with a color component in a color space;
   determining a set of gains associated with the image component to enhance depth characteristics of the color space; and
   generating the depth map by performing depth fusion based on the depth gradient map and the set of gains.

2. The method as recited in claim 1, further comprising:
   converting the 2D image to the 3D image based on the depth map.

3. The method as recited in claim 1, wherein the generating of the depth gradient map comprising:
   for an image line orderly retrieved from a plurality of image lines in the 2D image,
   determining an edge count for the image line by detecting one or more edges in the image line; and
   generating the depth gradient map based on edge counts determined for the plurality of image lines.

4. The method as recited in claim 3, wherein the one or more edges are detected by counting a number of color variations between adjacent pixels in the image line as the edge count, wherein each of the color variations exceeds a predetermined color variance threshold.

5. The method as recited in claim 3, wherein the one or more edges are detected by counting a number of brightness variations between adjacent pixels in the image line as the edge count, wherein each of the brightness variations exceeds a predetermined brightness variance threshold.

6. The method as recited in claim 3, wherein the depth gradient map includes a plurality of depth gradient values, and the plurality of depth gradient values are obtained by performing accumulation operations on the edge counts.

7. The method as recited in claim 6, wherein each of the plurality of depth gradient values is obtained by adding a corresponding edge count for a corresponding image line and a sub-total edge count for a subset of image lines of the 2D image up, wherein each image line in the subset of image lines is deemed further away from a viewing point in the 2D image than the corresponding image line.

8. The method as recited in claim 6, wherein the depth gradient map is generated after normalizing the plurality of depth gradient values.

9. The method as recited in claim 1, wherein the image component contains a plurality of color values extracted from a plurality of pixels in the 2D image, and the plurality of color values belong to the color component.

10. The method as recited in claim 1, wherein the determining of the set of gains comprising:
    for a color value selected from the image component, the color value being associated with a pixel in the 2D image,
    determining a corresponding gain based on the color value, wherein the corresponding gain ranges from a first value decreasing depth characteristics of the pixel to a second value increasing the depth characteristics of the pixel; and
    associating the corresponding gain with the pixel in the set of gains.

11. The method as recited in claim 1, wherein the performing of the depth fusion comprising:
    orderly generating a depth value for the depth map by multiplying a depth gradient value selected from the depth gradient map with a corresponding gain selected from the set of gains, wherein the depth gradient value is associated with a specific image line of the 2D image, and the corresponding gain is associated with a color value of a specific pixel in the specific image line.

12. The method as recited in claim 1, wherein the method is embodied in a non-transitory machine-readable storage medium as a set of instructions, which when executed by a computing processor, cause the computing processor to perform the method.

13. A method for converting a two-dimensional (2D) video to a three-dimensional (3D) video, comprising:
    selecting a first 2D image from the 2D video;
    generating a first depth gradient map associated with the first 2D image, wherein the first depth gradient map is configured to associate one or more edge counts with one or more depth values for the first 2D image;
    selecting a second 2D image from the 2D video, wherein the second 2D image is subsequent to the first 2D image;
    generating a first depth map by performing depth fusion using the first depth gradient map and the second 2D image; and
    converting the second 2D image to a first 3D image for the 3D video using the first depth map.

14. The method as recited in claim 13, further comprising:
    generating a second depth gradient map associated with the second 2D image;
    selecting a third 2D image from the 2D video, wherein the third 2D image is subsequent to the second 2D image;
    generating a second depth map by performing depth fusion based on the second depth gradient map and the third 2D image; and
    converting the third 2D image to a second 3D image for the 3D video using the second depth map.

15. The method as recited in claim 14, wherein the generating of the second depth gradient map and the generating of the first depth map are performed in parallel.

16. A system configured to generate a depth map for video conversion, comprising:
    a depth gradient map generator for generating a depth gradient map based on a 2D image, wherein the depth gradient map is configured to associate one or more edge counts with one or more depth values for the 2D image;
    a depth refinement engine for extracting one or more image components from the 2D image and determining one or more sets of gains respectively based on the one or more image components to enhance depth characteristics of a color space, wherein the one or more image components correspond to one or more components of the color space; and a depth fusion engine, coupled with the depth gradient map generator and the depth refinement engine, for generating the depth map by performing depth fusion based on the depth gradient map and the one or more sets of gains.

17. The system as recited in claim 16, further comprising:
a frame buffer coupled with the depth gradient map generator and the depth refinement engine, for storing the 2D image.

18. The system as recited in claim 16, further comprising:
a 3D conversion engine, coupled with the depth fusion engine, for converting the 2D image to a 3D image based on the depth map.

19. The system as recited in claim 16, wherein the depth gradient map generator comprising:
an edge filter for generating an edge count for each image line of the 2D image; and
an edge accumulator, coupled with the edge filter, for generating the depth gradient map by accumulating the edge count.

20. The system as recited in claim 19, wherein the depth gradient map includes a plurality of depth gradient values and the edge accumulator obtains a depth gradient value for the each image line by adding the edge count for the each image line and a sub-total edge count for a subset of image lines of the 2D image up.

21. The system as recited in claim 20, wherein the depth gradient map generator further comprising:
a scene depth assignment, coupled with the edge accumulator, for generating the depth gradient map by normalizing the plurality of depth gradient values, wherein the plurality of depth gradient values are normalized respectively based on a plurality of accumulated edge counts for image lines of the 2D image.

22. The system as recited in claim 16, wherein the depth refinement engine further comprising:
a color space extractor for extracting the one or more image components from the 2D image, wherein each of the one or more image components is associated with a color component in a color space; and
one or more depth refinement modules, coupled with the color space extractor, for generating the one or more sets of gains respectively corresponding to the one or more image components.

23. The system as recited in claim 16, wherein the depth fusion engine generates a plurality of depth values for the depth map by correspondingly performing multiplying operations using the depth gradient map and the one or more sets of gains.

* * * * *